INVENTORS
JOSEPH RIZZUTO
MICHAEL RIZZUTO
BY
Samuel J Stoll
ATTORNEY

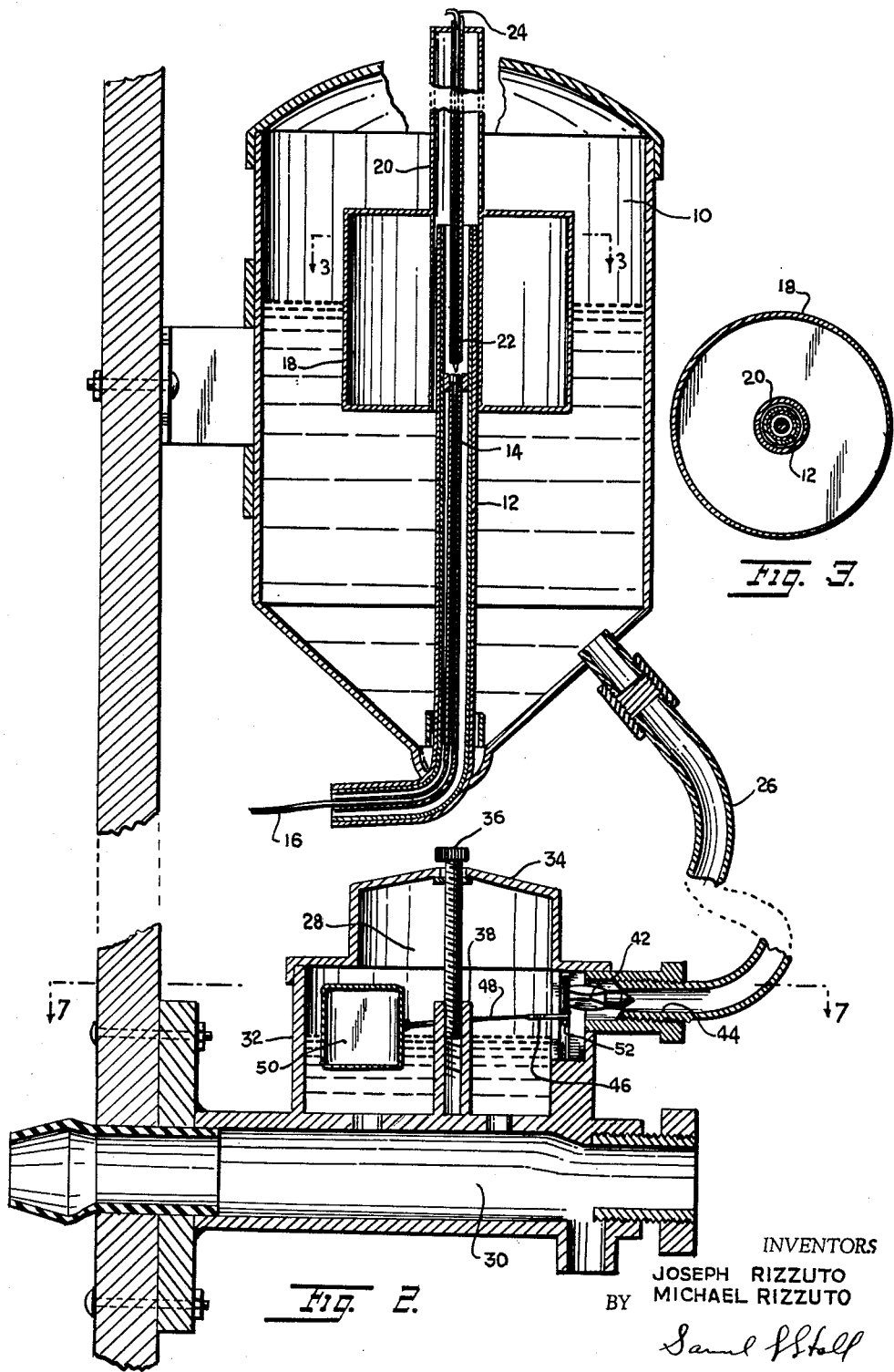

April 20, 1965   J. RIZZUTO ETAL   3,179,919
HYDRAULIC BRAKE AUXILIARY RESERVOIR AND SIGNAL DEVICE
Filed Aug. 14, 1962   4 Sheets-Sheet 3
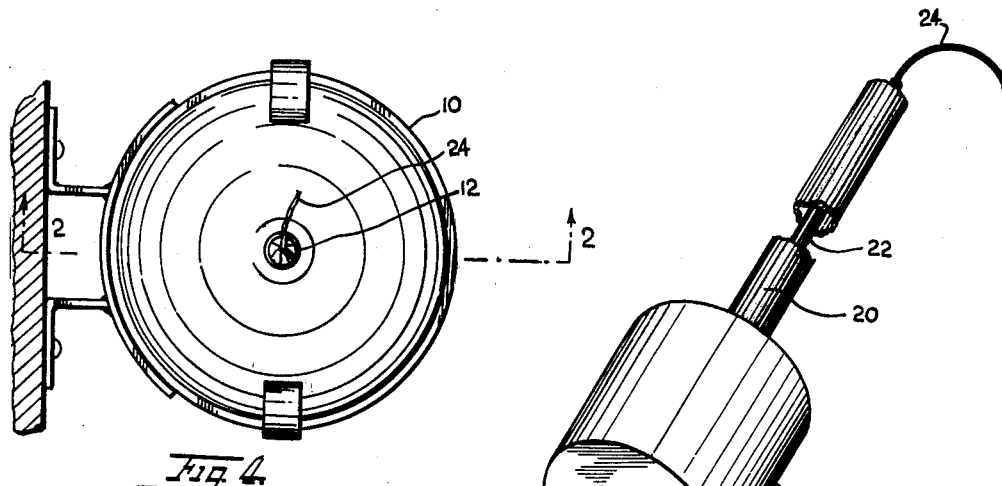
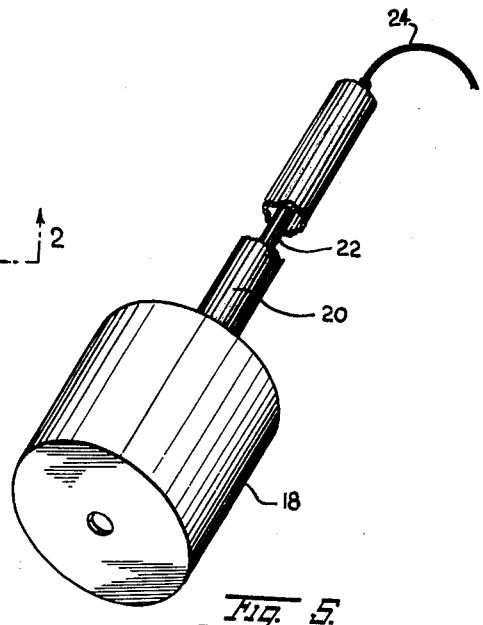
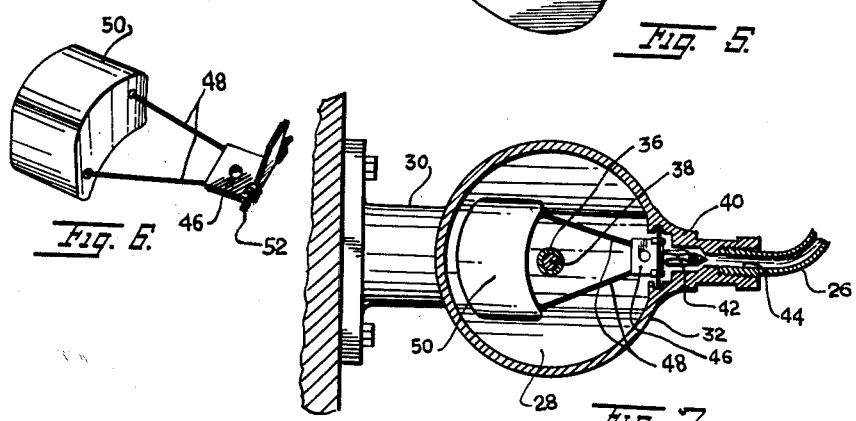
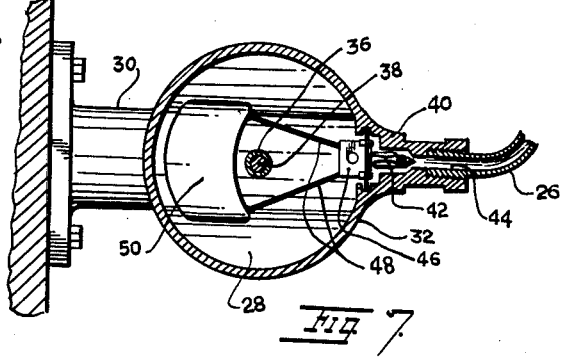
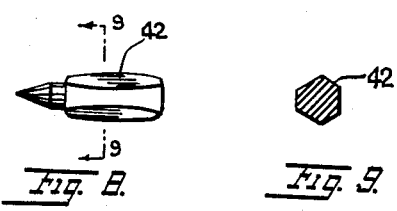
INVENTORS
JOSEPH RIZZUTO
MICHAEL RIZZUTO
BY
*Samuel Shell*
ATTORNEY April 20, 1965 J. RIZZUTO ETAL 3,179,919
HYDRAULIC BRAKE AUXILIARY RESERVOIR AND SIGNAL DEVICE
Filed Aug. 14, 1962 4 Sheets-Sheet 4

INVENTORS
JOSEPH RIZZUTO
MICHAEL RIZZUTO
BY
Samuel J. Stoll
ATTORNEY ent Office 3,179,919
Patented Apr. 20, 1965

3,179,919
HYDRAULIC BRAKE AUXILIARY RESERVOIR
AND SIGNAL DEVICE
Joseph Rizzuto, 407 Montauk Ave., and Michael J.
Rizzuto, 524 Milford St., both of Brooklyn 8, N.Y.
Filed Aug. 14, 1962, Ser. No. 216,817
2 Claims. (Cl. 340—59)

The present invention comprises an auxiliary fluid reservoir and a fluid level signalling device for use in conjunction with hydraulic brake systems such as found in automobiles and other such vehicles.

In a typical hydraulic brake system the piston in a master cylinder applies pressure to a brake fluid, said pressure is transmitted by said fluid through both rigid and flexible tubing and associated connection fittings to individual wheel brake cylinders whereupon the pressure is transmitted mechanically to the friction surfaces of each brake. There is a very great possibility of leakage occurring somewhere in the fluid system rendering said system inoperative.

Accordingly, an object of the present invention is to provide an auxiliary fluid reservoir which, through the appropriate mechanism described hereinbelow, automatically replenishes the fluid supply in the main brake system within the limit of capacity of said auxiliary reservoir.

Another object of the present invention is to provide a system for both audible and visual notification of a vehicle operator in the event of a leak in the hydraulic brake system of his vehicle.

In the drawings accompanying:

FIGURE 2 is a vertical cross section of FIGURE 1 taken along line 2—2 of FIGURE 4.

FIGURE 3 is a horizontal cross section of the auxiliary reservoir float taken along line 3—3 of FIGURE 2.

FIGURE 4 is a top view of the invention.

FIGURE 5 is a pictorial representation of the auxiliary reservoir float.

FIGURE 6 is a pictorial representation of the master reservoir float and bell-crank assembly.

FIGURE 7 is a horizontal cross section of the master reservoir taken across line 7—7 of FIGURE 2.

FIGURE 8 is a view of the needle of the needle valve assembly.

FIGURE 9 is a cross section of the needle taken along line 9—9 of FIGURE 8.

Figure 1:
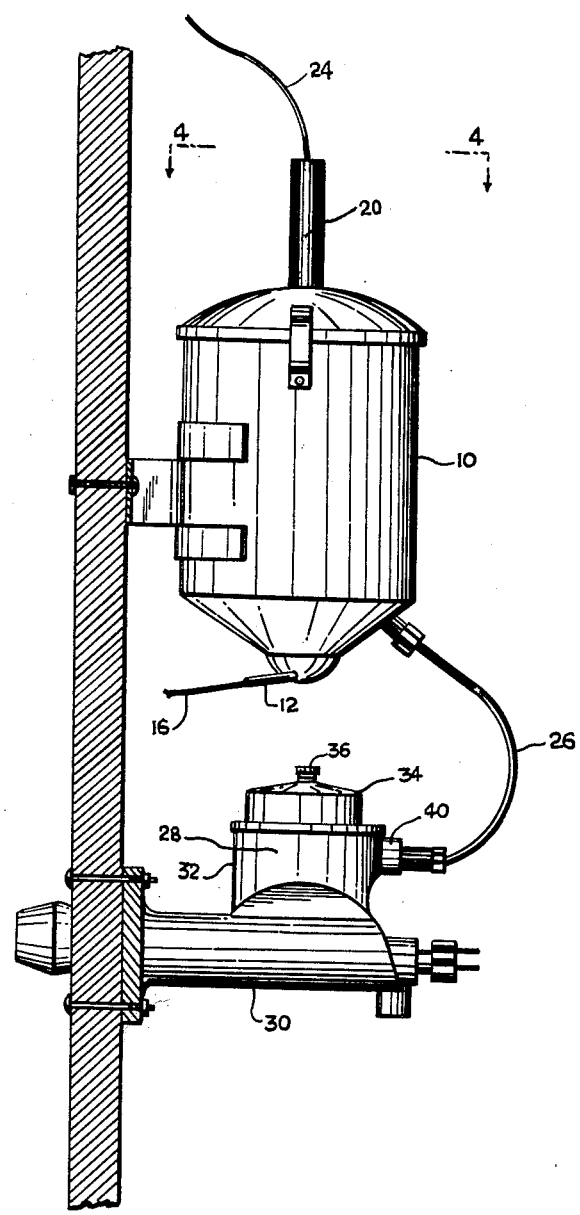
FIGURE 1 is a side view of the invention, including the master cylinder, mounted on the firewall of the vehicle.
Figure 10:
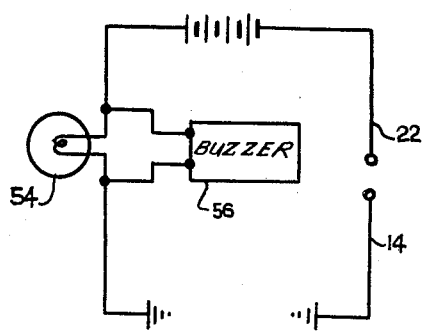
FIGURE 10 is a schematic representation of the electric circuit of the invention.
Figure 11:
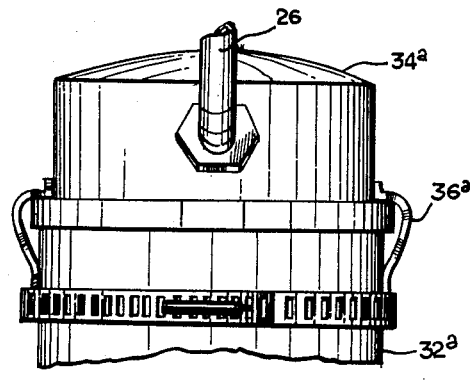
FIGURE 11 is a front view of a second embodiment of the master reservoir.
Figure 12:
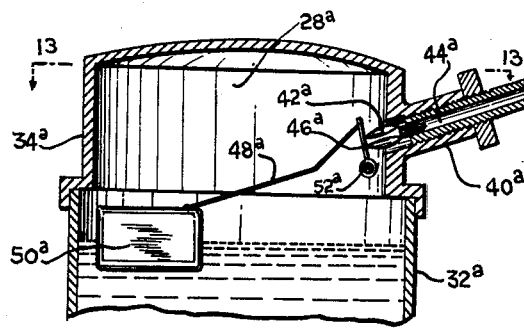
FIGURE 12 is a vertical cross section of the master reservoir shown in FIGURE 11.
Figure 13:
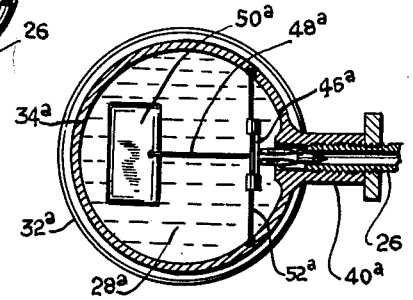
FIGURE 13 is a horizontal cross section taken along line 13—13 of FIGURE 12.
Figure 14:
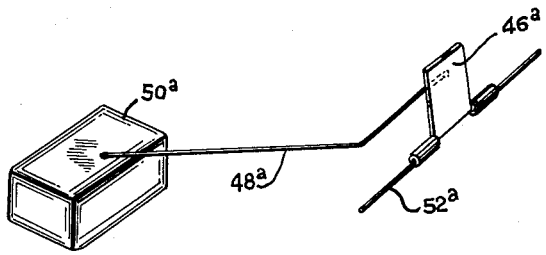
FIGURE 14 is a pictorial representation of the float and bell-crank assembly of the master reservoir shown in FIGURE 11.

With reference to the drawings, the auxiliary reservoir 10 has a center tube 12 extending most, but not all, of the way up from the bottom of said reservoir 10. Center tube 12 extends downwardly out of the bottom of said auxiliary reservoir 10 and is thereupon bent to any desired direction. In side said center tube 12 is the lower contact portion 14 of an electric switch assembly, said lower contact portion 14 being fixed in said tube 12 and being connected to the rest of the circuit by lead wire 16. Encircling and covering the upper portion of said center tube 12 is auxiliary reservoir float 18 and slide 20, said float 18 and slide 20 being able to move up and down as a single unit about tube 12. Centered within auxiliary float 18 and slide 20 is the upper contact portion 22 of said electric switch assembly, said switch assembly being composed of upper contact portion 22 and lower contact portion 14. A lead wire 24 connects upper contact portion 22 with the rest of the circuit. The upper contact portion 22 is fixed with respect to auxiliary float 18 and slide 20 such that when said auxiliary float 18 and slide 20 move up and down around tube 12 said switch assembly respectively opens and closes the circuit.

Auxiliary reservoir 10 is connected by means of a tube 26 to master cylinder reservoir 28, 28a, hereinabove reservoir 82 and will be described. Master reservoir 28a, 28a. Master reservoir 28a is a modification of master reservoir 28 and will be described. Master reservoir 28a, generally disposed directly above master cylinder 30, consists of a lower, generally cylindrical, housing 32 and an upper cap or cover 34 affixed to the lower housing 32 by means of a centrally disposed bolt 36 and threaded member 38, the latter being fixed with respect to lower housing 32. Lower housing 32 has extending therefrom a circular projection 40 into which is screwed a fitting which receives tube 26 from auxiliary reservoir 10. Also enclosed within projection 40 is a needle valve assembly consisting of a needle 42 and a seat 44 which may simply be the interior of the lower end of tube 26. Needle 42 is connected to one end of a bell-crank 46, the other end of which is connected by means of two arms 48 to a float 50 in the master reservoir 28. The shape and placement of master float 50 and arms 48 are such that no interference occurs with either bolt 36 or threaded member 38. Float 50, arms 48 and bell-crank 46, fixed rigidly to one another, can rotate as a unit about pin 52.

The electric circuit consists of a warning light 54 and a warning buzzer 56 in parallel with each other, said parallel combination being in series with a battery (generally that of the vehicle) and the electric switch assembly above described.

Having thus fully described the nature of the invention, its operation is a follows.

Under normal circumstances both master reservoir 28 and auxiliary reservoir 10 are filled to capacity with brake fluid, thus master float 50 and auxiliary float 18 are in their respective uppermost positions. When master float 50 is in its uppermost position, needle 42 is inserted within its seat 44 by means of bell-crank 46 and arms 48 thus preventing any fluid in tube 26 and auxiliary reservoir 10 from flowing into master reservoir 28. When auxiliary float 18 is in its uppermost position no electrical contact is made between upper contact portion 22 and lower contact portion 14 of the electric switch assembly, hence the circuit is open and both the visual and audible warning signals 54, 56 are not functioning.

Should a leak occur anywhere in the hydraulic brake system, the fluid supply in the system is replenished by master reservoir 28 which feeds into master cylinder 30. As the level of fluid in master reservoir 28 decreases, master float 50 is lowered, thereby pulling needle 42 out of its seat 44 by means of the rotation about pin 52 of said float 50, bell-crank 46 and arms 48. This permits the fluid in tube 26 and auxiliary reservoir 10 to flow into master reservoir 28, thereby refilling master reservoir 28. As said refilling occurs, master float 50 rises, thereby pushing needle 42 into seat 44 by means of rotation of float 50, bell-crank 46 and arms 48 about pin 52 and hence cutting off the flow of fluid from tube 26 and auxiliary reservoir 10. It is obvious that the rate of flow of fluid from tube 26 and auxiliary reservoir 10 into master reservoir 28 is inversely proportional to the level of fluid in master reservoir 28, the flow being greatest when the level is least and the flow being negligible when the level is greatest.

As the fluid level in auxiliary reservoir 10 decreases, auxiliary float 18 is lowered thereby causing upper contact portion 22 to meet lower contact portion 14 and hence close the circuit and actuate warning light 54 and warning buzzer 56. This more than adequately warns the vehicle operator of a leak in his vehicle's hydraulic brake system. Since warning light 54 and warning buzzer 56 are wired in parallel, the failure of one of these warning components does not affect the operation of the other; that is, if the warning light bulb 54 should burn out, the warning buzzer 56 will continue to provide for notification of the vehicle operator in the event of a leak.

A possible modification of master reservoir 28 is shown as master reservoir 28a wherein projection 40a is in cover 34a and is tilted slightly upward with respect to the horizontal. Master float 50a is connected by means of an arm 48a and crank 46a to the needle 42a. Master float 50a, arm 48a and crank 46a rotate as a rigid unit about pin 52a as the fluid level in master reservoir 28a changes, thereby removing or inserting needle 42a from or into seat 44a. Cover 34a is affixed to the cylindrical housing 32a by means of a clip and band assembly 36a.

All other mechanical features of the modified version of the invention are identical with the unmodified version; the methods of operation to the modified and unmodified versions are identical.

What is claimed is:

1. In a vehicle hydraulic brake system having a main fluid reservoir in conjunction with a master cylinder, a removable cap closing said main fluid reservoir, an auxiliary fluid reservoir, means connecting said auxiliary fluid reservoir to said main fluid reservoir, said main fluid reservoir being in vertical alignment with said auxiliary fluid reservoir, means for controlling the flow of brake fluid from said auxiliary fluid reservoir to said main fluid reservoir through said connecting means, said flow control means being mounted at least in part in, and being entirely supported by, said cap, and means for indicating to the vehicle operator a reduction in the level of brake fluid in said auxiliary fluid reservoir, said flow control means comprising a valve, including a valve seat and a movable valve closure member cooperative therewith, and a float connected to said movable valve closure member, said float extending into said main fluid reservoir and adapted to drop with the fluid level in said main fluid reservoir when a loss of fluid is occasioned, the opening of said valve resulting in replenishment of the fluid supply in said main reservoir from said auxiliary fluid reservoir, thereby causing the fluid level to rise in said main fluid reservoir, said float being adapted to rise with said fluid level and thereby to close the valve and shut off the flow of fluid from said auxiliary fluid reservoir.

2. In a vehicle hydraulic brake system in accordance with claim 1, said indicating means comprising a float-actuated electric switch and visual and audible signalling means, said float-actuated electric switch being disposed within said auxiliary reservoir and the float and a contact arm thereof which extends into the auxiliary fluid reservoir being adapted to move vertically downward when the level of the fluid drops in order to close the switch and adapted to move vertically upward when the level of the fluid rises in order to open the switch, said visible signalling means comprising an electric light bulb, said audible signalling means comprising an electric buzzer, said bulb and said buzzer being wired in parallel with each other and said parallel combination being wired in series with said float-actuated switch and with a source of electric current.

References Cited by the Examiner

UNITED STATES PATENTS

| 2,613,293 | 10/52 | Marks | 340—59 |
| 2,680,169 | 6/54 | Capuano | 200—84 |
| 2,862,196 | 11/58 | Christman | 340—52 |
| 2,866,866 | 12/58 | La Plante | 200—84 |
| 2,882,365 | 4/59 | MacGriff et al. | 200—84 |

NEIL C. READ, *Primary Examiner.*